(12) United States Patent
Hubert et al.

(10) Patent No.: US 11,198,338 B2
(45) Date of Patent: Dec. 14, 2021

(54) DEVICE FOR DETERMINING A ROTATIONAL SPEED AND A VIBRATION OF A WHEEL END OF A VEHICLE

(71) Applicant: Aktiebolaget SKF, Gothenburg (SE)

(72) Inventors: Simon Hubert, Saint Cyr sur Loire (FR); Jens Graf, Schweinfurt (DE)

(73) Assignee: Aktiebolaget SKF, Gothenburg (SE)

(*) Notice: Subject to any disclaimer, the term of this patent is extended or adjusted under 35 U.S.C. 154(b) by 68 days.

(21) Appl. No.: 16/374,806

(22) Filed: Apr. 4, 2019

(65) Prior Publication Data
US 2019/0329610 A1 Oct. 31, 2019

(30) Foreign Application Priority Data
Apr. 25, 2018 (DE) .................. 102018206435.0

(51) Int. Cl.
*B60C 23/06* (2006.01)

(52) U.S. Cl.
CPC .......... *B60C 23/062* (2013.01); *B60C 23/065* (2013.01)

(58) Field of Classification Search
CPC .. B60C 23/062; B60C 23/065; G01M 13/045; G01M 17/025; G01M 17/013; G01M 13/04; G01P 3/48
See application file for complete search history.

(56) References Cited

U.S. PATENT DOCUMENTS

| 5,677,488 A | * | 10/1997 | Monahan | F16C 19/30 340/682 |
| 2006/0108170 A1 | * | 5/2006 | Ishikawa | B60T 8/171 180/282 |
| 2019/0285513 A1 | | 9/2019 | Cheve | |
| 2020/0158562 A1 | * | 5/2020 | Hatakeyama | G01M 13/028 |

FOREIGN PATENT DOCUMENTS

| DE | 19600640 A1 | 7/1997 |
| EP | 2085755 B1 | 8/2012 |

* cited by examiner

*Primary Examiner* — Xin Y Zhong
(74) *Attorney, Agent, or Firm* — Garcia-Zamor Intellectual Property Law; Ruy Garcia-Zamor; Bryan Peckjian

(57) ABSTRACT

A device for determining a rotational speed and a vibration of a wheel end of a vehicle, in particular a truck, is disclosed. The device includes a single sensor measuring a signal during a rotation of the wheel end. The sensor is arranged at the wheel end, and a determination unit for determining the rotational speed and the vibration of the wheel end using the signal of the single sensor is provided.

13 Claims, 4 Drawing Sheets

DEVICE FOR DETERMINING A ROTATIONAL SPEED AND A VIBRATION OF A WHEEL END OF A VEHICLE

CROSS-REFERENCE

This application claims priority to German patent application no. 102018206435.0 filed on Apr. 25, 2018, the contents of which are fully incorporated herein by reference.

TECHNOLOGICAL FIELD

The present invention relates to a device for determining a rotational speed and a vibration of a wheel end of a vehicle.

BACKGROUND

In vehicles, for example trucks, it is often necessary to monitor several elements in order to detect damages or wear, preferably in advance before a failure occurs. One of these elements may be for example a wheel end used in a truck. In such a wheel end, a bearing may be provided and sensors may be used for detecting a failure of such a bearing. Typically, at least two sensors are used, one for detecting a vibration of the bearing as vibrations may be indicative for damages on the bearing, and one for detecting a rotational speed of the bearing or the wheel end. In common systems, an accelerometer is used for detecting the rotational speed. However, such a component is very expensive and increases the overall costs.

SUMMARY

Thus, it is object of the present invention to provide a device for monitoring a wheel end which is less expensive and easy to implement.

This object is solved by a device for determining a rotational speed and a vibration of a wheel end of a vehicle, in particular a truck.

The device comprises one single sensor measuring a signal during a rotation of the wheel end. The sensor is arranged at the wheel end.

In contrast to common systems, only a single sensor is needed for measuring both the rotational speed and the vibrations. The device further comprises a determination unit which may determine based on the signal of this one single sensor the rotational speed as well as the vibration of the wheel end.

The use of only a single sensor to measure the speed and the vibration is possible as the speed and the vibration frequencies, which are measured by the sensor, are not in the same frequency range. The single sensor is measuring a complex signal in which the vibrations are modulated with a sine wave. The sine wave is created by the acceleration of the sensor turning on the wheel end being alternatively positive and negative.

Due to defects of a bearing of the wheel end, for example spallings on raceways of the bearing, vibrations may occur which change the sensor signal. In other words, the sine wave indicating the rotational speed may be superimposed with some distortions having a higher frequency than the sine wave.

Thus, the measured sensor signal can be regarded as being composed of a low frequency sine wave (indicating the speed), of high frequencies (due to vibrations) and noise frequencies (which may occur for example due to any environmental distortions).

As the frequencies of the rotational speed and the vibrations differ from each other, they can easily be distinguished and thus the signal(s) of one single sensor can be used for determining the rotational speed as well as the vibrations.

As only a single sensor is needed, the overall costs of the monitoring device may be reduced compared to common systems. Further, the single sensor may be a piezoelectric sensor which is less expensive than an accelerometer which further reduces the overall costs. Further, a piezoelectric sensor is typically smaller than an accelerometer and thus, the required space for the sensor can be reduced. This also provides the advantage that the sensor can be positioned closely to a mechanical attachment between a printed circuit (containing the determination unit) and a mechanical spacer, which are linked to the base plate.

In order to determine the rotational speed and the vibrations, the determination unit is adapted to perform a frequency analysis on the measured signal for determining one or more peaks in the analyzed signal indicating the rotational speed and/or defects inducing the vibration of the wheel end.

By performing a frequency analysis, the sensor signal in a time domain can be transferred into a frequency domain. In the frequency domain, the peaks correspond to the frequency of the rotational speed and the frequency/frequencies of the vibration(s) can be more easily detected.

As explained above, the rotational speed has a low frequency in a sine wave form. When transforming the time spectrum of the signal into a frequency spectrum, using a frequency analysis, one very high peak is present at a low frequency, around 10 Hz. This peak corresponds to the speed which is the sine wave on the time signal.

Defects on the bearing are passed by the sensor during the rotation of the wheel end. If the speed is higher, the sensor passes the defects in shorter time intervals. Thus, the higher the speed, the higher is the defect frequency. Thus, the vibration or defect frequency is directly speed dependent. If the vibration frequency is higher, it can be more easily distinguished from the low speed frequency. Therefore, in order to clearly distinguish the speed frequency from the vibration frequencies, the wheel end should rotate with a minimum speed of 30 km/h.

The frequency analysis may be one of a discrete Fourier transformation (DFT), a fast Fourier transformation (FFT) or a Goertzel algorithm.

The DFT may be used to perform a frequency or Fourier analysis. Since it deals with a finite amount of data, it can be implemented in computers by numerical algorithms or even dedicated hardware. These implementations usually employ efficient fast Fourier transform (FFT) algorithms.

Preferably, a Goertzel algorithm is used which is a specific kind of DFT. It analyses one selectable frequency component from a discrete signal. For covering a full spectrum, the Goertzel algorithm has a higher order of complexity than a fast Fourier transform (FFT) algorithm, but for computing a small number of selected frequency components, it is more numerically efficient. The simple structure of the Goertzel algorithm makes it well suited to small processors and embedded applications. Thus, the Goertzel algorithm provides a further advantage as such an algorithm gives similar results as a FFT or DFT but uses less resources of a microcontroller and saves battery capacity.

As explained above, the measured signal may also contain some noise. Thus, the determination unit may be adapted to filter noise from the measured signal, in particular prior to performing a frequency analysis. The noise filtering may be done for example by applying a high pass or low pass filter, adapted to the noise frequency. The result may be a noise free signal containing speed and vibration information.

According to a further embodiment, the determination unit is adapted to filter the measured signal using the detected rotational speed.

After extraction of the speed, which is the highest peak in the frequency domain, this speed frequency may be filtered from the measured signal. Thus, by applying a speed dependent filter on the raw signal, the speed may be "cut" from the measured signal and afterwards, the vibration frequencies in the signal may be evaluated.

According to a further embodiment, the determination unit is adapted to apply one or more band pass filters prior to the frequency analysis in order to create one or more band passes, in particular more than two.

By using a band pass filter, the signals are reduced to frequencies within the band pass. Thus, the signal to be processed during the frequency analysis can be reduced, which reduces the needed computing and battery resources.

For example, the sensor may measure a signal from 0 to 4 kHz, then a band pass filter may be applied to reduce the number of points (for example to a frequency range of 250 Hz) to be able to speed up the Goertzel algorithm.

When only one band pass is created, it may be the case that this band pass does not contain all information being needed for the speed and vibration detection, in particular when the frequencies within the band pass only contain frequencies of the speed or the vibration. Preferably, two or three band passes are created as this number of band passes may ensure that there the speed and/or vibration frequencies are properly extracted while at the same time the amount of signal to be processed is small enough to reduce the necessary computing resources compared to a processing of the whole signal.

When applying for example three band pass filters, the measured signal may be filtered at different band pass frequencies in order to reduce the overall signal size to be stored. Thus, the memory needed for storing the measured signal may be reduced. In addition, the band pass filters may be used to increase the signal to noise ratio (SNR) of the signal, for example in order to ease the detection of the speed and vibration frequencies.

In order to ensure that the resulting band passes include all necessary frequencies, the band pass filters may be optimized for an expected frequency spectrum of the rotational speed and/or an expected frequency spectrum of the vibrations.

In the following, the measuring and processing of the signal is exemplary described. The acquisition of the signal, i.e. the measuring of the signal using the sensor, may be carried out with a sampling frequency of 56 Hz. After this acquisition, the signal may be filtered as described above and the sampling frequency may be further reduced. When three band passes are used, the sampling frequency may be reduced to 28 kHz (for Band Pass 1), to 14 kHz (Band Pass 2) and to 7 kHz (Band Pass 3). This over sampling of the acquisition acts as an anti-aliasing. As the memory used in the device is typically not sufficient to save this amount of data, these signals are not extracted from the same input measurement, but may be derived from several measurements which may be done in sequence, for example:

Measurement 1—resampling Band Pass 1—processing Band Pass 1

Measurement 2—resampling Band Pass 2—processing Band Pass 2

Measurement 3—resampling Band Pass 3—processing Band Pass 2

Thus, the processing may comprise: applying the band pass filter and performing the spectrum or frequency analysis. This spectrum may then be analyzed to detect peaks which represent the bearing defect as described above.

According to a further embodiment, the determination unit is adapted to perform one of the frequency analysis to frequencies between 0 and 500 Hz.

By applying the frequency analysis to frequencies between 0 and 500 Hz, it can be ensured that all frequencies which are to be expected for speed and vibrations are contained in the frequency analysis. Typically, the ratio between the speed frequency (about 10 Hz) and the vibration frequencies (for example between 60 and 200 Hz) is between 10 and 25. Thus, when applying the frequency analysis to frequencies up to 500 Hz, also the expected vibration frequencies are reliably covered.

Further, one of the frequency analysis may be limited to frequencies below 100 Hz, preferably below 50 Hz, so that the algorithm for detecting the speed frequency can be speed up as only a part of the spectrum needs to be analyzed. Thus, before applying the frequency analysis being intended to detect the speed, a down sampling may be used on the measured signal as the searched frequencies are known. The number of sample points is thus reduced to ease calculation and save battery capacity.

Further, it can be guaranteed that the detected frequency is indicative for the speed as the bearing defect frequencies, i.e. the vibration frequencies, are located at much higher frequencies in the spectrum.

According to a further embodiment, the device further comprises an output unit for outputting a signal, in particular a warning signal, based on the determined rotational speed and vibration of the wheel end.

The device can be mounted on a truck wheel end to monitor a bearing used in the wheel end. When a vibration is detected, the device can give a warning to a user via a signal, for example as an acoustic or visual signal, or via a wireless communication to an external control unit and/or to the determination unit being arranged remotely. Such a signal may be used for example as a trigger to exchange the bearing or to perform any maintenance on the bearing.

According to a further aspect, a method for determining a rotational speed and a vibration of a wheel end of a vehicle, in particular a truck, is provided. The method comprises the following steps: measuring a signal by a single sensor during a rotation of the wheel end and determining the rotational speed and the vibration of the wheel end using the signal of the single sensor.

The embodiments and features described with reference to the device of the present invention apply mutatis mutandis to the method of the present invention.

According to a further aspect, the invention relates to a computer program product comprising a program code for executing the above-described method when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will be-come apparent from the subsequent description and dependent claims, taken in conjunction with the accompanying drawings, in which:

DETAILED DESCRIPTION

Figure 1:
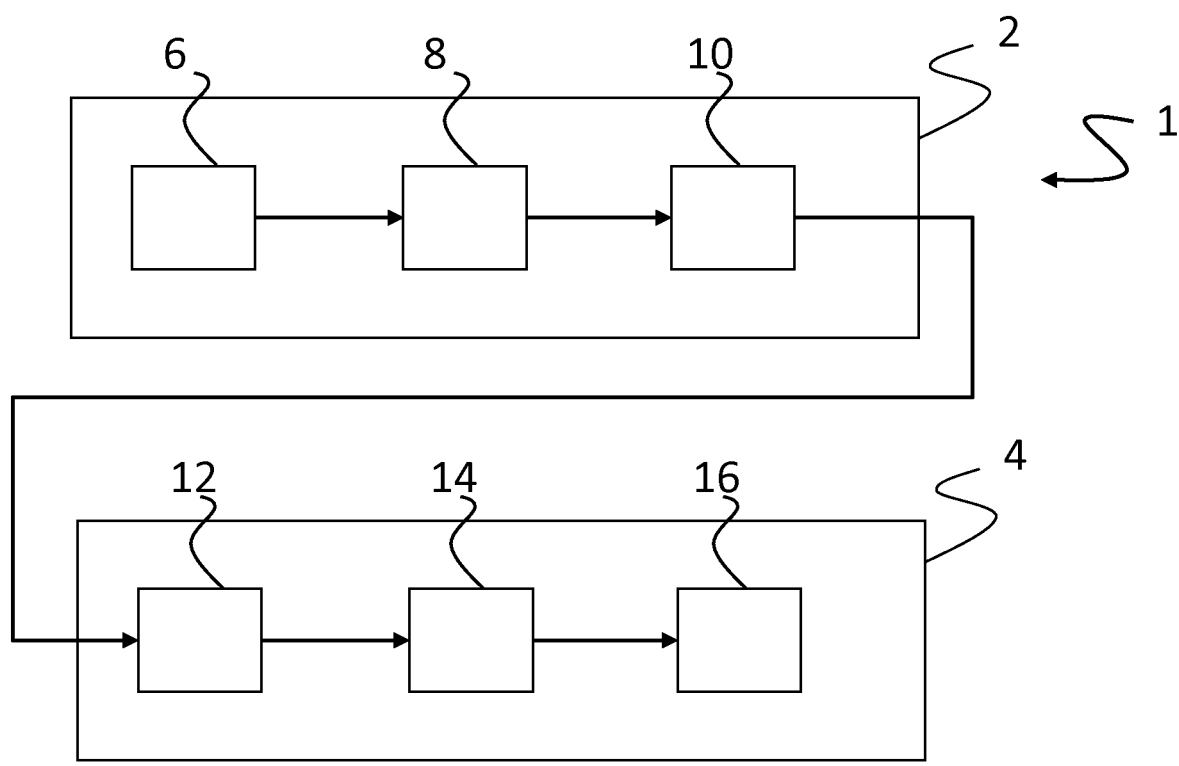
FIG. 1 shows a device for determining a rotational speed and a vibration of a wheel end of a vehicle.

In the Figures, like reference numerals designate like or functionally equivalent elements, unless otherwise indicated.

FIG. 1 shows a device 1 for determining a rotational speed and a vibration of a wheel end of a vehicle. The device 1 comprises a sensor unit 2 and a determination unit 4.

For measuring a rotational speed and vibration of the wheel end, the sensor unit 2 comprises a single sensor 6. This sensor 6 is preferably a piezoelectric sensor as such a sensor is smaller and cheaper than a commonly used accelerometer for measuring the rotational speed.

Figure 2A:
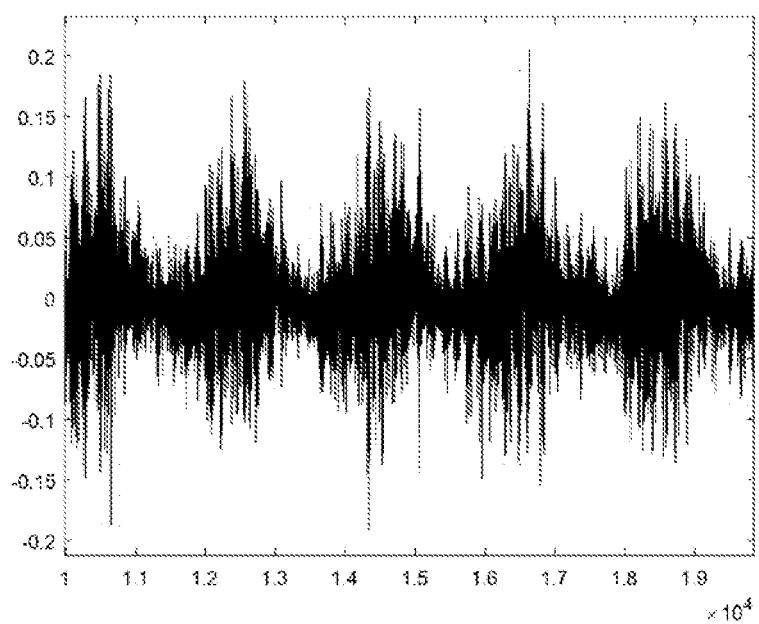
FIGS. 2a, 2b show a signal of a sensor used in the device of FIG. 1, time domain (2a) and frequency domain (2b)
Figure 2B:
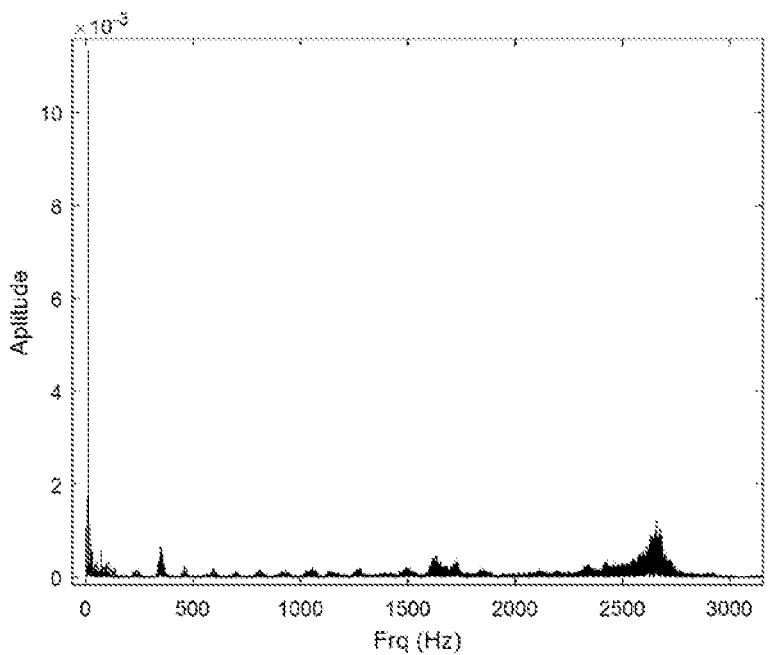

The single sensor 6 measures a complex signal which is shown in FIG. 2a in the time domain and in FIG. 2b in the frequency domain. The signal is a sum of a low frequency sine wave (representing the speed), of high frequencies (due to vibrations) and noise frequencies.

Especially in the frequency domain of FIG. 2b, it can be seen that the signal comprises one very high peak at low frequency, around 10 Hz. This peak corresponds to the speed which is the sine wave in the time domain. At higher frequencies, there are smaller peaks, but they are denser. There are not at one single frequency but at more and different ranges. These frequencies are caused by mechanical vibrations due to defects of the wheel end. As the rotational speed and the vibrations have different frequencies, it is possible to extract both information from the same sensor.

The sensor unit 2 further comprises an amplifier and filter 8 as well as an analogue to digital converter 10, which is used for converting the analog sensor signal into a digital signal which can be further processed by the determination unit. The amplifier and filter 8 can be used for amplifying the measured signal and for filtering the signal in order to reduce any noise contained in the signal.

After the analogue to digital conversion 10, the signal is forwarded to the determination unit 4. The determination unit 4 comprises a software unit 12 which is used to manage the analogue to digital conversion 10.

Subsequently, the determination unit 4 performs a speed frequency analysis 14 which will be described with reference to FIGS. 3, 5 and 6 as well as a vibration frequency analysis 16, which will be described with reference to FIGS. 3, 4 and 6.

Figure 3:
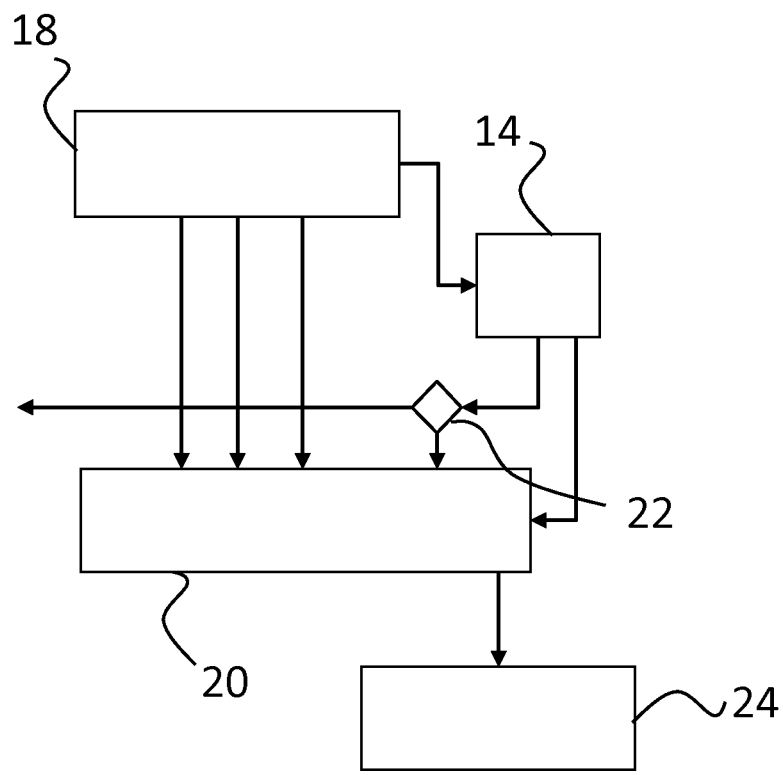
FIG. 3 shows a schematic flow diagram of the main process for determining the rotational speed and the vibration of a wheel end of a vehicle.

FIG. 3 shows a schematic flow diagram of the main process carried out by the determination unit 4.

Figure 4A:
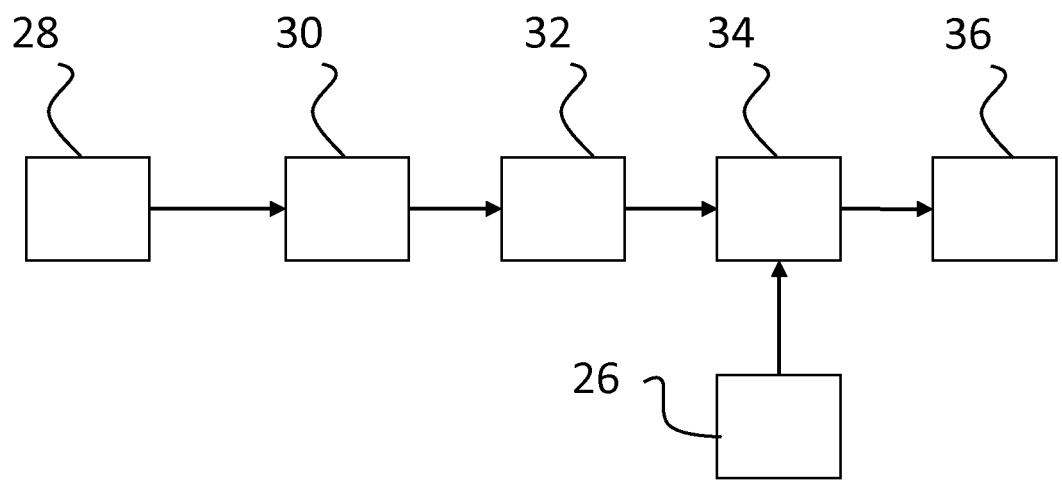
FIGS. 4a, 4b show a schematic flow diagram of a pre-processing of the signal measured by a sensor of FIG. 1.
Figure 4B:
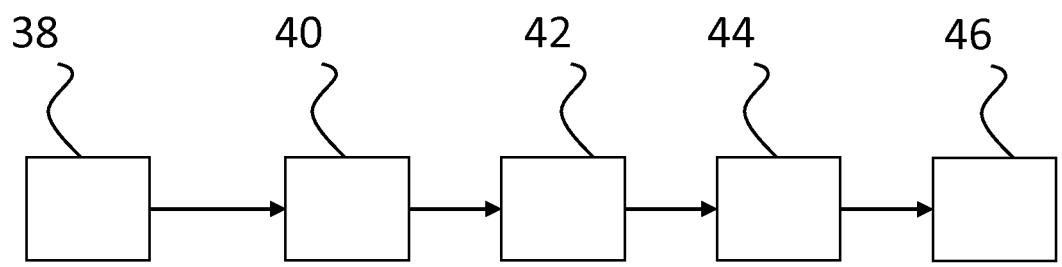

In a first step, the signal is preprocessed 18, which is described in further detail in FIGS. 4a and 4b.

FIG. 4a shows that a signal 28, being the analogue to digital converted sensor signal, is supplied to a FIR (finite impulse response) filter unit 30. This unit 30 is used for band pass filtering of the signal with respect to the frequencies to be processed in the following. The band pass may be set according to the different frequencies, i.e. whether the speed, or any vibration signal should be processed after the pre-processing. The filtering by the filter unit 30 can be repeated depending on the overall number of band passes which should be created.

In a further step 32, an absolute value is determined. This step may be used for multiplying the negative part of the signal with "−1" to make the signal positive. After this step, an average and decimation filter 34 is applied to the signal. The average and decimation filter 34 may be used for calculating the average value of the positive signal and to reduce the signal as it is not necessary to have a lot of points for the next step, i.e. the detection of the speed and vibration frequencies.

The result 36 of this pre-processing is further used in the following processing as explained in FIG. 3. It should be noted that the pre-processing of steps 26 to 36 can be carried out using different band pass filters, resulting in several outputs.

In a further pre-processing, which is shown in FIG. 4b, an average vibration result is determined. The input signal 38 is supplied to a FIR filter 40. This filtering may be used for enveloping the signal, resulting in an average signal. By enveloping the signal, a smooth curve of the not-smooth sensor signal may be created. After this filtering unit 40, an absolute value of this signal is determined 42. As in step 32, the negative part of the signal is basically multiplied by −1 to make the signal positive. After this step, an average and decimation filter 44 is applied to the signal for calculating the average value of the positive signal and to reduce the signal analogue to step 34. The result 46 of this pre-processing is further used in the following processing as explained in FIG. 3.

Returning to FIG. 3, after the pre-processing 18 of FIG. 4, there exist three average vibration values, which are forwarded to a signals analysis 20. Depending on the number of band passes used in the pre-processing, the number of average vibration values can be more or less than three. If a higher number of measurements is used, the results may be improved.

Figure 5:
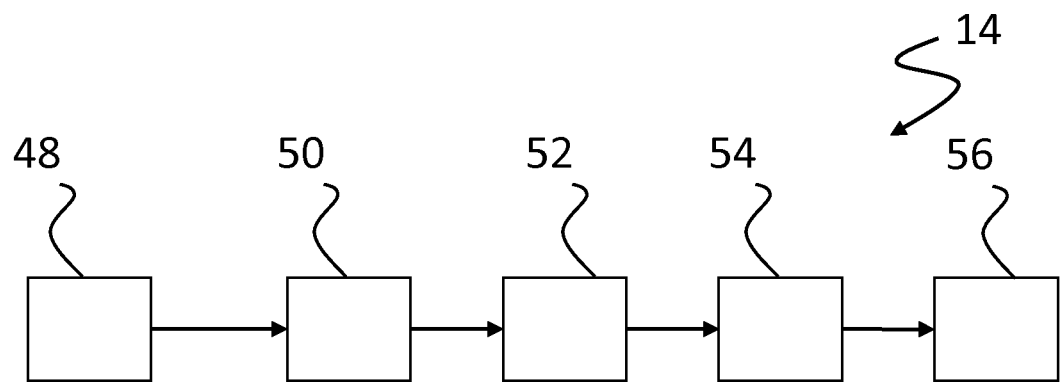
FIG. 5 shows a schematic flow diagram for determining the rotational speed.

In addition, a speed value is determined in the pre-processing 18 which is forwarded to a speed analysis unit 14 which is further described in FIG. 5.

The speed analysis unit 14 applies a FFT 50, for example a Goertzel algorithm, to the sensor signal 48. After the FFT 50, the signal is in the frequency domain. Subsequently, the for example three highest maxima of the frequency domain signal are determined, 52. In a following step 54, the maxima are analyzed. For example, it is determined which of the maxima lies in a frequency range which is expected for the speed. The maxima, which is considered as to be the speed, is output, 56.

If there is more than one frequency line above a certain value threshold, a remarkable modulation between wheel rotation (speed) and axle resonance occurs and a reliable speed determination is not possible. In such a case, the measurement may for example be repeated or a signal may be output that a reliable determination is not possible.

Returning to FIG. 3, the speed value is used to decide whether the speed value is true, 22. This decision can be based for example on the value of the speed, whether the value is reasonable. If the speed value is true, the speed is used in a following analysis of the vibration frequencies, which is further described in FIG. 6.

First, a frequency range of each spectrum of the band passes is calculated, 58. This is done using the speed 56. After this, a FFT 60, for example a Goertzel algorithm, is used to transfer the signal into the frequency domain. This is done using the result 36 of the pre-processing of FIG. 4.

Subsequently, the for example five highest maxima of the frequency domain signal are determined, 62. In a following step 64, an average value of the spectrum without the maxima is calculated. This average value is then used in step 66 to confirm that the determined maxima can be considered to be real maxima and not only a random high value of the signal.

After the confirmation 66, the frequency of the confirmed maxima is scaled, 68. This means that the value of the frequency can be normalized in order to be able to compare measurements done at different speeds. After the scaling 68, the result may be added to a data base, 70, and may then be output, 72.

Figure 6:
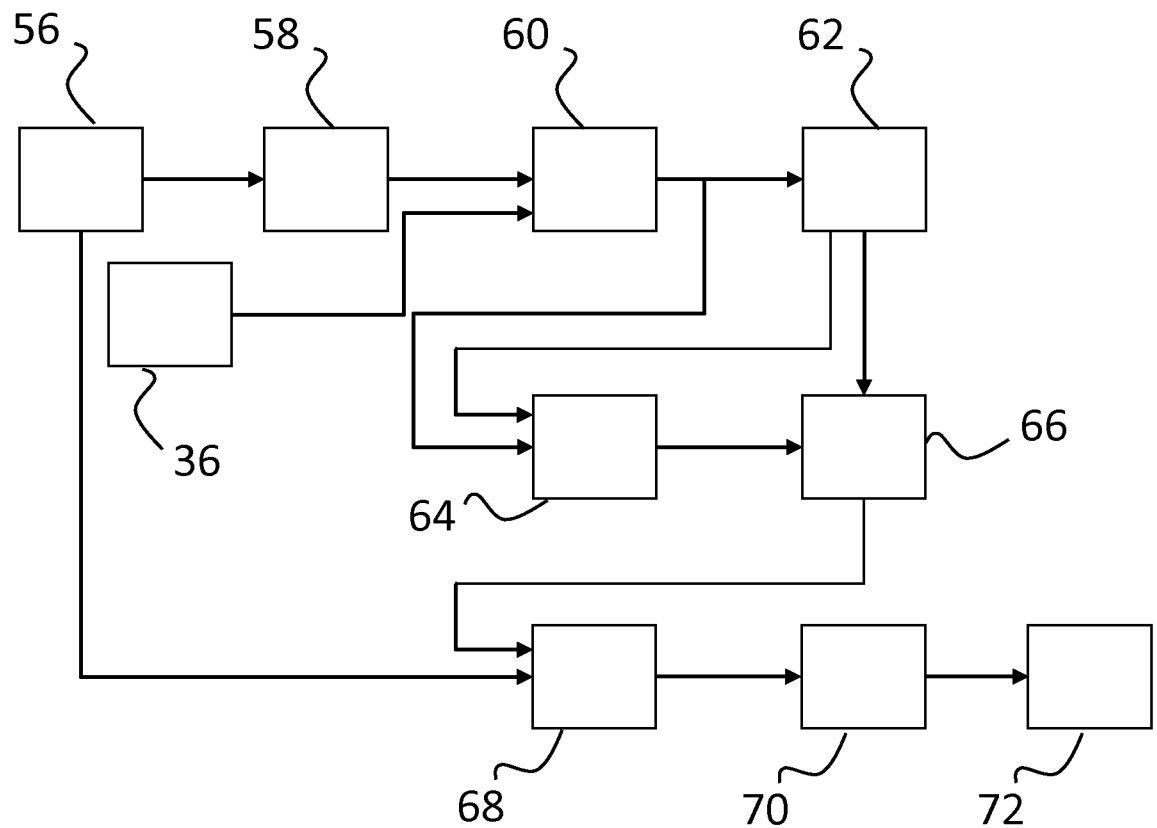
FIG. 6 shows a schematic flow diagram for determining the vibration of the wheel end.

Returning to FIG. 3, the results of the frequency analysis as carried out in FIG. 6 may be forwarded to a unit 24. In this unit 24, signals, for example warning signals, may be generated, a history of the frequencies (and the corresponding damages) may be stored or the like.

The above described device for determining a rotational speed and a vibration of a wheel end of a vehicle, in particular a truck, only needs a single sensor to measure both speed and vibration of the wheel end. Thanks to a piezoelectric sensor and to a frequency analysis, the speed can be extracted from the same measurement as the vibration data. This has the advantage that the cost of the overall device may be reduced while keeping the same performances.

LIST OF REFERENCE NUMBERS 1 device
2 sensor unit
4 determination unit
6 sensor
8 amplification and filter unit
10 analogue to digital converter
12 software unit
14 speed frequency analysis unit
16 vibration frequency analysis unit
18 pre-processing unit
20 vibration frequency analysis
22 comparison
24 unit
26-36 method steps
38-46 method steps
48-56 method steps
58-72 method steps

What is claimed is:

1. A device for determining a rotational speed and a vibration of a wheel end of a truck, comprises:
a single sensor is arranged at the wheel end and is configured to measure both the rotation speed and the vibration of the wheel end and output a signal during a rotation of the wheel end, the signal being a single, complex signal comprising a range of frequencies from zero (0) to five hundred (500) Hertz (Hz), the range of frequencies further defining a subset of rotational speed frequencies and a subset of vibration frequencies,
a determination unit comprises a pre-processing unit adapted to receive the single, complex signal and determine a speed value and a vibration value therefrom,
the determination unit comprises a speed frequency analysis unit for determining the rotational speed of the wheel end using the speed value received from the pre-processing unit,
wherein the frequencies measured for the subset of rotational speed frequencies is less than the frequencies measured for the subset of vibration frequencies,
wherein the speed frequency analysis unit transmits the rotational speed both to a comparison unit and to a vibration frequency analysis unit which is part of the determination unit, the comparison unit being adapted to determine if the speed value transmitted by the speed frequency analysis unit is true, the comparison unit being in communication with the vibration frequency analysis unit to indicate thereto when the speed value is not true,
the vibration frequency analysis unit is adapted to perform a frequency analysis on the vibration value received from the pre-processing unit for determining one or more peaks in the analyzed signal indicating defects inducing the vibration of the wheel end, and
wherein the determination unit is adapted to apply one or more band pass filters prior to the frequency analysis in order to create one or more band passes.

2. The device according to claim 1, wherein the sensor is a piezoelectric sensor.

3. The device according to claim 1, wherein the frequency analysis is one of a discrete Fourier transformation, a fast Fourier transformation, or a Goertzel algorithm.

4. The device according to claim 1, wherein the pre-processing unit of the determination unit is adapted to filter noise from the single, complex signal prior to performing a frequency analysis.

5. The device according to claim 1, wherein the determination unit is adapted to filter the measured signal using the detected rotational speed.

6. The device according to claim 1, wherein the one or more band pass filters are optimized for an expected frequency spectrum of the rotational speed and/or the vibrations.

7. The device according to claim 1, wherein the determination unit is adapted to perform one of the frequency analysis to frequencies below one hundred (100) Hertz (Hz).

8. The device according to claim 1, further comprising an output unit for outputting a signal, in particular a warning signal, based on the determined rotational speed and vibration of the wheel end.

9. A device for determining a rotational speed and a vibration of a wheel end of a truck, comprises:
a single sensor is arranged at the wheel end and is configured to measure both the rotation speed and the vibration of the wheel end and output a signal during a rotation of the wheel end, the signal being a single, complex signal comprising a range of frequencies from zero (0) to five hundred (500) Hertz (Hz), the range of frequencies further defining a subset of rotational speed frequencies and a subset of vibration frequencies, and
a determination unit for determining the rotational speed and the vibration of the wheel end using the single, complex signal received from the single sensor, the determination unit being adapted to cut the subset of rotational speed frequencies from the subset of vibration frequencies, wherein the frequencies measured for the subset of rotational speed frequencies is less than the frequencies measured for the subset of vibration frequencies, the determination unit comprising:
- a pre-processing unit adapted to receive the single, complex signal and determine a speed value and three average vibration values therefrom, and
- a vibration frequency analysis unit adapted to receive the three average vibration values which are transmitted by the pre-processing unit, wherein the vibration frequency analysis unit is adapted to perform a frequency analysis on the three average vibration values for determining one or more peaks in the frequencies measured for the subset of rotational speed frequencies indicating defects inducing the vibration of the wheel end, and wherein the determination unit is adapted to apply one or more band pass filters prior to the frequency analysis in order to create one or more band passes.

10. The device according to claim 9, wherein the sensor is a piezoelectric sensor.

11. The device according to claim 9, wherein the frequency analysis is one of a discrete Fourier transformation, a fast Fourier transformation, or a Goertzel algorithm.

12. The device according to claim 9, wherein the one or more band pass filters are optimized for an expected frequency spectrum of the rotational speed and/or the vibrations.

13. The device according to claim 9, further comprising an output unit for outputting a signal, based on the determined rotational speed and vibration of the wheel end.

* * * * *